April 28, 1931.  E. W. BRADY  1,802,964
CABLE SUPPORTING BRACKET
Filed Nov. 19, 1927
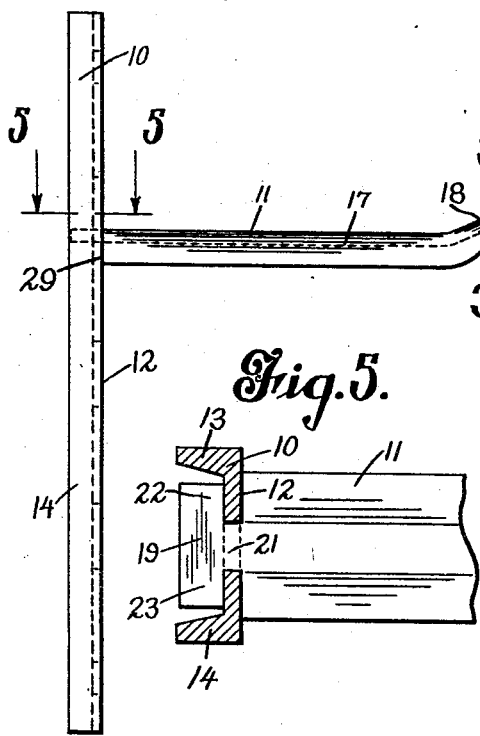
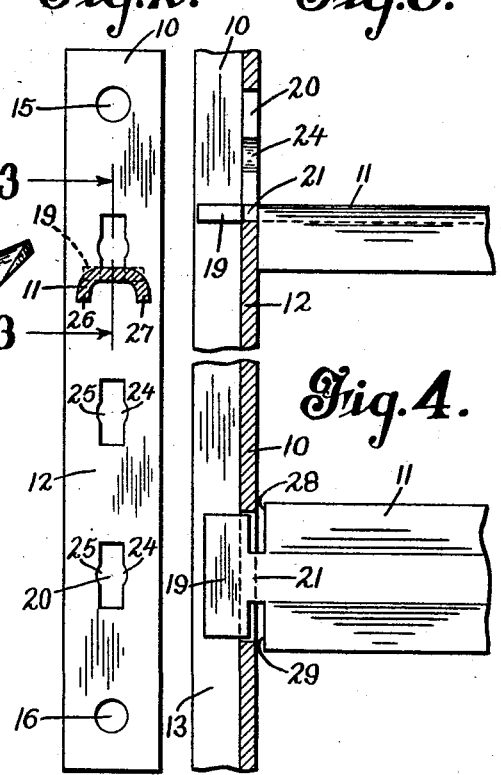
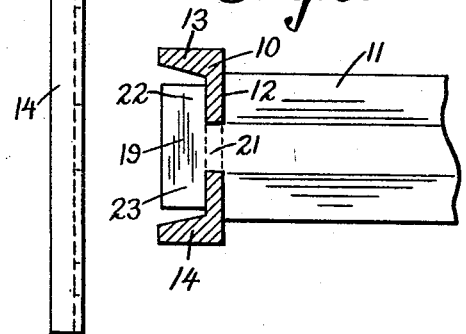
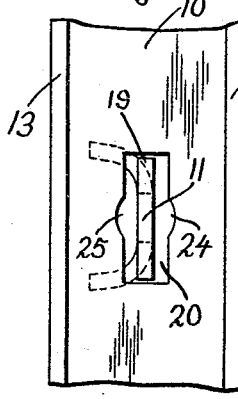
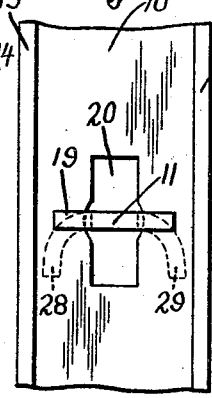
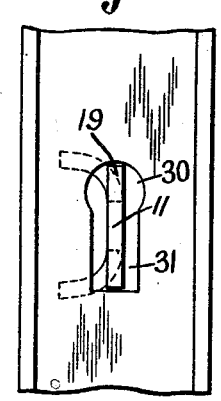
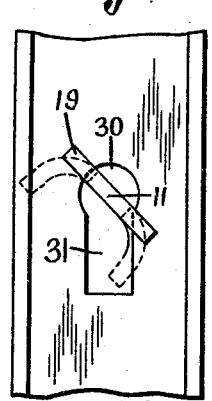
Inventor
Edmund W. Brady
By Rockwell & Bartholow
Attorneys Patented Apr. 28, 1931

1,802,964

UNITED STATES PATENT OFFICE

EDMUND W. BRADY, OF NEW BRITAIN, CONNECTICUT, ASSIGNOR TO THE BRADY ELECTRIC & MANUFACTURING COMPANY, OF NEW BRITAIN, CONNECTICUT

CABLE-SUPPORTING BRACKET

Application filed November 19, 1927. Serial No. 234,518.

This invention relates to cable supporting brackets or the like, and more especially to that type of bracket which is composed of a metal attaching plate adapted to be more or less permanently secured to a wall or other suitable support, and an arm or step adapted to be detachably secured to the plate.

In brackets of the above type various means have been proposed for attaching the arm to the plate. For instance, it has been proposed to provide a T-shaped slot in the plate and a T-shaped head on the arm. In this form the head on the arm is inserted through the cross in the T-shaped slot, and the stem of the T-shaped head caused to descend into the stem of the slot until it reaches the bottom thereof. Connections of this sort are open to the objection that if the arm is accidentally moved upwardly until the head of the arm is opposite the cross in the slot the arm will become readily disengaged from the plate. Various other expedients have been proposed, some of them quite complicated in form, but all of which have been more or less objectionable, in that they do not provide an efficient means for supporting and locking the arm on the plate. As one of the primary objects of my invention, I contemplate a simple but efficient form of connection between the plate and arm in which they are locked together more efficiently than in similar devices heretofore known.

Another object of the invention is to provide plates and arms simple in form which may be readily pressed, if desired, out of sheet material.

A still further object of the invention is to provide a bracket for supporting cables in which there is no danger of mutilating a cable if it is dragged over the arm of the bracket.

An additional object of the invention is to provide a form of connection between two two members to be attached securely together such that the members cannot by relative movement between them in a single direction be placed in position for disengagement.

To these and other ends, the invention consists in the novel features and combination of parts to be hereinafter described and claimed.

In the drawings,

Fig. 1 is a side elevation of a bracket according to my invention;

Fig. 2 is a front elevation of the bracket shown in Fig. 1;

Fig. 3 is a sectional view along line 3—3 of Fig. 2;

Fig. 4 is a view similar to Fig. 3, but showing the arm in a different position;

Fig. 5 is a sectional view along line 5—5 of Fig. 1;

Figs. 6 and 7 are views showing the manner in which the parts of the bracket are brought into engagement; and Figs. 8 and 9 are views similar to Figs. 6 and 7, but showing a modified form.

Referring to the drawing in which I have illustrated my invention by showing some preferred embodiments thereof, the improved cable support comprises two parts, a plate 10 adapted to be secured to a wall, pole, or other suitable support, and an arm 11, which is adapted to be detachably connected to the plate 10. The plate 10 is preferably made of steel, and as shown in the drawings, is of channel shape cross-section having an elongated substantially flat outer wall 12, and substantially parallel longitudinally extending integrally formed side portions 13 and 14, adapted when the plate is secured on a wall, or the like, to space the wall 12 outwardly therefrom. At either end of the plate 10 in the outer wall 12 are perforations 15 and 16 through which lag screws, or other suitable securing means, may be passed for attaching the plate to a wall on which it is to be supported.

The arm 11 is preferably made of pressed steel, although it may be readily understood that it may be made by other processes, for example, by casting, and as shown comprises an elongated body 17 substantially U-shaped in cross section having its outer end 18 inclined slightly upwardly, for a purpose to be hereinafter described, and having at the opposite end a head 19 in the form of a T, adapted to be inserted in an opening 20 in plate 10, of which there are a plurality provided equally spaced along the median line of the wall 12.

The T-shaped head 19 of the arm 11 is arranged on the end thereof substantially in alignment with the upper surface of the arm and comprises a stem 21, and laterally extending shoulders 22 and 23 forming the head of the T. Each of the openings or slots 20 in the plate 10 is substantially rectangular in form, having a length slightly greater than the width of the T shaped head 19, and a width substantially the same as the width of the stem 21. At an intermediate point, the slots 20 are interrupted by arcuate portions 24 and 25 which form segments of a circle having a diameter slightly greater than the width of the stem 21. The arm 11, which as stated above, is preferably U-shaped in cross-section, is provided with downwardly extending side walls 26 and 27 forming the legs of the U, which terminate in shoulders 28 and 29 spaced from shoulders 22 and 23 a distance substantially equal to the thickness of the wall 12 of plate 10.

To attach the arm 11 to the plate 10, the head 19 is inserted into the slot 20, in the manner shown in Figs. 4 and 6, to such an extent that the shoulders 28 and 29 are brought into engagement with the outer surface of the wall 12, whereupon the arm 11 is rotated into the position shown in Fig. 7, the arcuate portions of the slot permitting this rotation to take place. The head 11 is then caused to descend in the slot 20 until it occupies the position shown in Figs. 1, 2 and 3, with the stem 21 resting on the bottom of the slot 20. In this position, the shoulders 22, 23, and 28, 29, are in engagement with the inner and outer surfaces of the plate 10, effectively supporting the arm 11 in place. As shown in Figs. 2 and 5 of the drawings, the stem 21 fits fairly tightly in the slot 20 and rotation of the arm is thus prevented, unless the arm is raised to such a position that the stem 21 is opposite the arcuate portions 24 and 25, which provide clearance for that purpose. It is thus impossible to dislodge the arm 11 from the plate 10 if the arm 11 should be accidentally displaced upwardly.

The upwardly curved portion 18 on the outer end of the arm 11 is adapted to prevent a cable from sliding off the arm, while the upper convex surface is such that a cable may be dragged thereover if desired, there being no danger of mutilating the cable since all sharp points are eliminated. The shoulders 28 and 29 extend below the shoulders 22 and 23 a considerable distance and provide a rigid support for the arm 11 when mounted on the plate 10.

In Figs. 8 and 9, I have shown a modified form in which an arcuate portion 30 is provided at the upper end of the slots 31 rather than at an intermediate point as in the slots 20. In this form, the head 19 of the arm 11 is inserted through the slot and then the arm is raised until the stem 21 is opposite the arcuate portion 30, whereupon the arm may be rotated, and then caused to descend until the stem 21 rests on the bottom of the slot 31.

While I have described my invention as a cable supporting bracket, it will be readily understood that it has a much broader application; for instance, it is adapted to be used as a pole step, in which case, the plates 10 are arranged at suitable intervals along the surface of a pole, and the arm 11 may be inserted and withdrawn by a lineman in climbing and descending the pole. When so used, the provision of an arm which may not be readily displaced becomes of great importance, since it quite often happens that the lineman may displace one of the steps while feeling for it with one of his feet in descending.

While I have shown and described a preferred embodiment of my invention, it will be understood that it is not to be limited to all the details shown, but is capable of modification and variation within the spirit of the invention and the scope of the appended claim.

What I claim is:—

In a cable bracket or the like, a plate and an arm, said plate being provided with an opening having parallel vertically directed side edges at its lower end and being of circular shape immediately above the parallel side edges, and said arm being generally of U-shaped cross-sectional form and having a T-shaped head, the U-shaped part of the arm terminating in a pair of transversely and downwardly extending shoulders, the head being provided with a stem of rectangular cross-sectional form and having a width substantially equal to the distance between the parallel side edges of the opening, the head of the T providing a pair of laterally directed shoulders parallel to the first named shoulders and spaced therefrom a distance substantially equal to the thickness of the plate, the T-shaped head being insertable through the opening and rotatable to bring the sides of the stem into alignment with the parallel side edges of the opening, whereupon the stem may be moved into the lower end of the opening, the shoulders on the U-shaped portion and on the head cooperating to hold the arm against downward swinging movement and the parallel side edge portions of the stem cooperating with the parallel side edge portions of the opening to hold the arm against rotary movement in the opening.

In witness whereof, I have hereunto set my hand this 16th day of November, 1927.

EDMUND W. BRADY.